United States Patent
Wugofski (10) Patent No.: US 6,826,632 B1
(45) Date of Patent: Nov. 30, 2004

(54) SYSTEM FOR IDENTIFYING THE INTERCONNECTION OF PERIPHERAL DEVICES

(75) Inventor: Theodore David Wugofski, Fort Worth, TX (US)

(73) Assignee: Gateway, Inc., Irvine, CA (US)

(*) Notice: Subject to any disclaimer, the term of this patent is extended or adjusted under 35 U.S.C. 154(b) by 0 days.

(21) Appl. No.: 09/313,916

(22) Filed: May 18, 1999

(51) Int. Cl.[7] .............................................. G06F 3/00
(52) U.S. Cl. ............................. 710/8; 710/2; 710/12; 710/104; 710/110; 710/300; 709/208; 709/220; 709/221; 709/223
(58) Field of Search ......................... 710/2, 8, 12, 300, 710/104, 110; 709/208, 220–221, 223

(56) References Cited

U.S. PATENT DOCUMENTS

| | | | |
|---|---|---|---|
| 3,573,377 A | 4/1971 | Anderson et al. ............... 179/2 |
| 4,315,320 A | 2/1982 | Gabriel ........................ 364/808 |
| 4,626,848 A | 12/1986 | Ehlers .................... 340/825.69 |
| 4,647,973 A | 3/1987 | Deiss .......................... 358/181 |
| 4,808,992 A | 2/1989 | Beyers et al. ........... 340/825.24 |
| 4,868,766 A | 9/1989 | Oosterholt ................... 364/522 |
| 4,985,855 A | 1/1991 | Aldrich et al. .............. 364/522 |
| 5,063,520 A | 11/1991 | Klein ........................... 364/512 |
| 5,144,548 A | 9/1992 | Salandro ..................... 364/138 |
| 5,168,441 A | 12/1992 | Onarheim et al. ........... 364/146 |
| 5,375,210 A | 12/1994 | Monnes et al. ............. 395/275 |
| 5,535,325 A | 7/1996 | Cattell et al. ................ 395/161 |
| 5,548,346 A | 8/1996 | Mimura et al. ............. 348/738 |
| 5,621,482 A | 4/1997 | Gardner et al. ............. 348/725 |
| 5,883,621 A * | 3/1999 | Iwamura ....................... 725/37 |
| 6,044,425 A * | 3/2000 | Nakamura ................... 710/104 |
| 6,076,106 A * | 6/2000 | Hamner et al. ............. 709/223 |
| 6,332,159 B1 * | 12/2001 | Hatae et al. ................. 709/224 |
| 6,393,557 B1 * | 5/2002 | Guthridge et al. ............. 713/1 |
| 6,452,935 B1 * | 9/2002 | Gibbs ......................... 370/439 |
| 6,529,951 B1 * | 3/2003 | Okuyama et al. ........... 709/223 |
| 6,546,419 B1 * | 4/2003 | Humpleman et al. ....... 709/223 |

OTHER PUBLICATIONS

*Soundscape Product Listing*, Soundscape Gallery of Unique Audio+Video, http://www.sonic.net/soundscape/pionrec.html, Mar. 2, 1998, 9:05 a.m.

* cited by examiner

Primary Examiner—Jeffrey Gaffin
Assistant Examiner—Eron Sorrell
(74) Attorney, Agent, or Firm—Suiter-West (57) ABSTRACT

A system and method for identifying the interconnection of peripheral devices in an information handling system and generating a model of the interconnection of the devices is disclosed. The system identifies devices in the information handling system, builds device objects in the model representing each identified device, and builds interconnect objects in the model representing the interconnection of the devices with each other and the information handling system. The model may then be used to control operation of the peripheral devices of the information handling system.

28 Claims, 5 Drawing Sheets

SYSTEM FOR IDENTIFYING THE INTERCONNECTION OF PERIPHERAL DEVICES

FIELD OF THE INVENTION

The present invention relates generally to information handling systems, and more specifically to information handling systems having one or more interconnected peripheral devices.

BACKGROUND OF THE INVENTION

Present consumer electronics based device control systems permit a user to specify macros which operate across multiple devices to allow the system to provide a specific control function. For example, a macro may be defined that turns on a television, selects a specific input (e.g., the AV-1 input) of the television, and selects the "PLAY" command for a video cassette recorder (VCR). Such macros, however, do not include information describing how the devices controlled by the control system are interconnected. Thus, the control system does not "know" that the VCR is attached to the AV-1 input and would not be able to dynamically record to the VCR without the user either predefining an appropriate macro to accomplish this function or manually selecting the AV-1 output on the television and "RECORD" command on the VCR.

Known to the art are computer-based information handling systems such as convergent personal computer/television systems or the like which permit a user to specify devices which are connected to each input of the system. However, such systems do not currently permit the user to specify how the external devices are interconnected with each other.

Consequently, it would be advantageous to provide a system capable of interacting with a user to identify how peripheral devices are interconnected with each other and to generate a model representing the interconnection of the devices. This model could then be used by the information handling system to provide control functions for the peripheral devices.

SUMMARY OF THE INVENTION

Accordingly, the present invention is directed to a novel system for identifying the interconnection of peripheral devices in an information handling system and generating a model of the interconnection of the devices. The model may then be used to control operation of the interconnected peripheral devices. The system identifies peripheral devices interconnected with the information handling system via a query based user interface and builds objects in the model representing the identified devices. The system also identifies interconnections between each identified peripheral device and the information handling system, and builds objects within the model representing these interconnections.

The present invention is also directed to a novel method for identifying the interconnection of peripheral devices in an information handling system. The method includes the steps of identifying devices interconnected with the information handling system and generating a model representing the identified peripheral devices and the interconnections of the devices with other devices in the system. The model is generated by building a device object representing each identified device. Each device object may include one or more input objects representing inputs of the identified device and/or one or more output objects representing outputs of the identified device. An interconnect object may then be built representing the interconnection of the device with another device via each input or output. The method may be tangibly embodied on a medium readable by the information handling system capable of causing the information handling system to execute the method.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
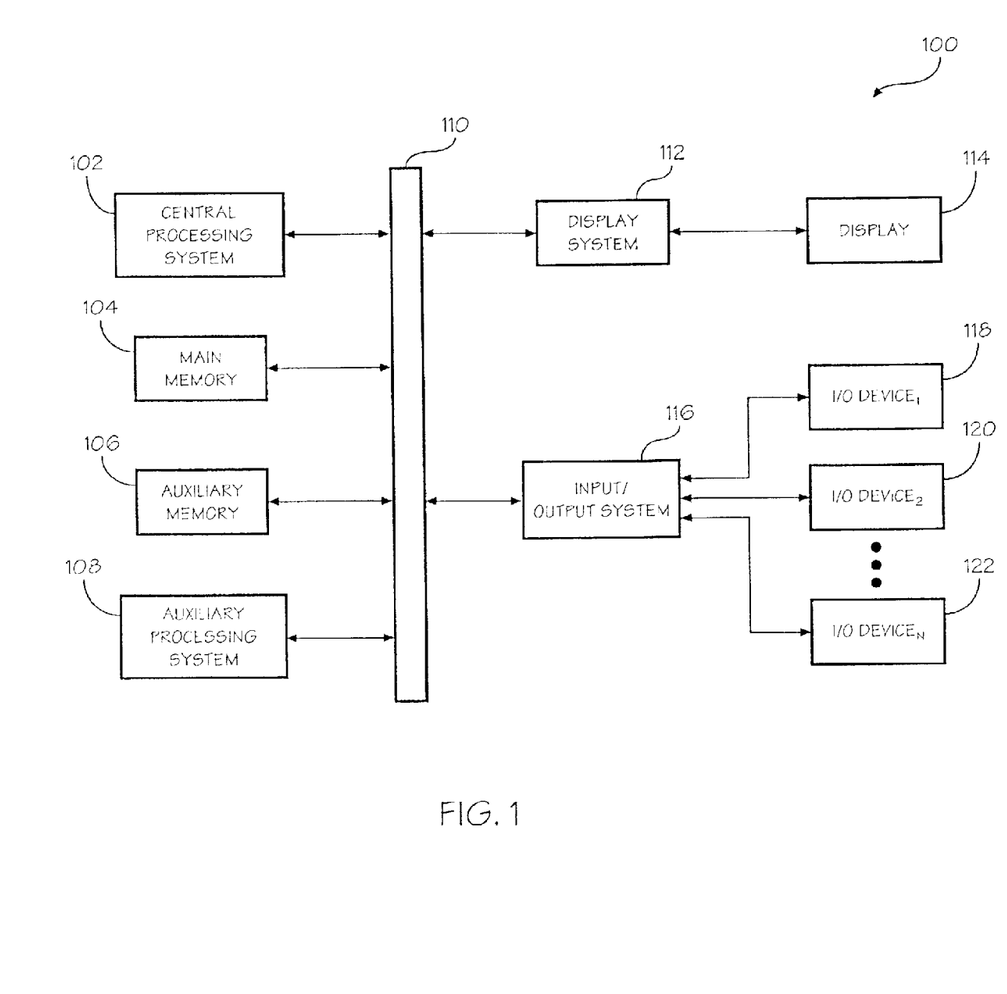
FIG. 1 is a block diagram depicting a typical hardware environment of a computer-based information handling system.

Referring now to FIG. 1, a hardware system in accordance with the present invention is shown. The hardware system shown in FIG. 1 is generally representative of the hardware architecture of a computer-based information handling system. The information handling system may be, for example a convergent television/computer system (convergence system) which is adapted to integrate multiple information and entertainment media such as, for example, television, telephony, Internet, e-mail, and interactive gaming into a single platform. The information handling system may function as a central control device to control peripheral components of the convergent television/computer system such as an interactive entertainment (video gaming) apparatus, a video cassette recorder (VCR), compact disk or video laser disk players, a digital versatile disk (DVD) or readable/writeable digital versatile disk (DVD+RW) device, or audio equipment such as an audio processor, audio amplifier, surround sound or AC-3 type processor.

The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IIEEE 488 general-purpose interface bus (GPIB), IEEE 696/S-100, and so on. Other components of the hardware system 100 include main memory 104, auxiliary memory 106, and an auxiliary processing system 108 as required. The main memory 104 provides storage of instructions and data for programs executing on the central processing system 102. The main memory 104 is typically semiconductor based memory such as dynamic random access memory (DRAM) and or static random access memory (SRAM). The auxiliary memory 106 provides storage of instructions and data that are loaded into the main memory 104 before execution. The auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 100 further includes a display system 112 for connecting to a display device 114, and an input/output (I/O) system 116 for connecting to one or more I/O devices 118, 120 up to N number of I/O devices 122. The display system 112 may comprise a video display adapter having all of the components for driving the display device, including video random access memory (VRAM), buffer, and graphics engine as desired. The display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between the one or more I/O devices 118–122. For example, the input/output system 116 may comprise a serial port, parallel port, infrared port, network adapter, printer adapter, radio-frequency (RF) communications adapter, universal asynchronous receiver-transmitter (UART) port, television (TV) tuner, audio adapter, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, audio system, microphone, speaker, etc. The input/output system 116 and I/O devices 118–122 may provide or receive analog or digital signals for communication between the hardware system 100 of the present invention and external devices, networks, or information networks, or information sources. The input/output system 116 and I/O devices 118–122 preferably implement industry promulgated architecture standards, including Ethernet IEEE 802 standards (i.e., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfermode (ATM), integrated digital services network (ISDN), personal communications services (PCS), transmission control protocol/Internet protocol (TCP/IP), serial line Internet protocol/point to point protocol (SLIP/PPP), IEEE-1394 high speed serial bus, home audio/video interoperability interface (HAVI), and so on. It should be appreciated that modification or reconfiguration of the hardware system 100 of FIG. 1 by one having ordinary skill in the art would not depart from the scope or the spirit of the present invention.

The present invention is directed to a system and method for identifying the peripheral components or devices interconnected with the information handling system and generating a model representing the interconnection of the devices with the information handling system and with each other. This model may then be used by the information handling system to provide control, analysis, and diagnostic functions for the peripheral devices. According to an exemplary embodiment, a sequence of dialogs with a user of the information handling system (e.g., an end consumer, a home theater installer, etc.) identifies the number and types of peripheral devices interconnected with the information handling system (i.e., directly connected to an input or output of the information handling system or interconnected with the information handling system via another peripheral device). The dialogs also identify how the devices are interconnected with the information handling system and each other. An "object" may then be built for each device, each connection (input or output) of each device, and each interconnection between a device and the information handling system or another device. These objects may be stored (e.g., saved in the memory 104 or persistent auxiliary memory 106 of the hardware system shown in FIG. 1) to be used by the information handling system for analysis and control of the identified devices. Preferably, each object comprises a collection of routines and data structures that performs a particular task or implements a particular abstract data type. The object may, for example, consist of two parts: a public interface which lists the constants, data types, variables, and routines that can be accessed by other objects or routines, and an implementation which is private (accessible only to the object) and which contains the source code that actually implements the routines in the object.

Figure 2:
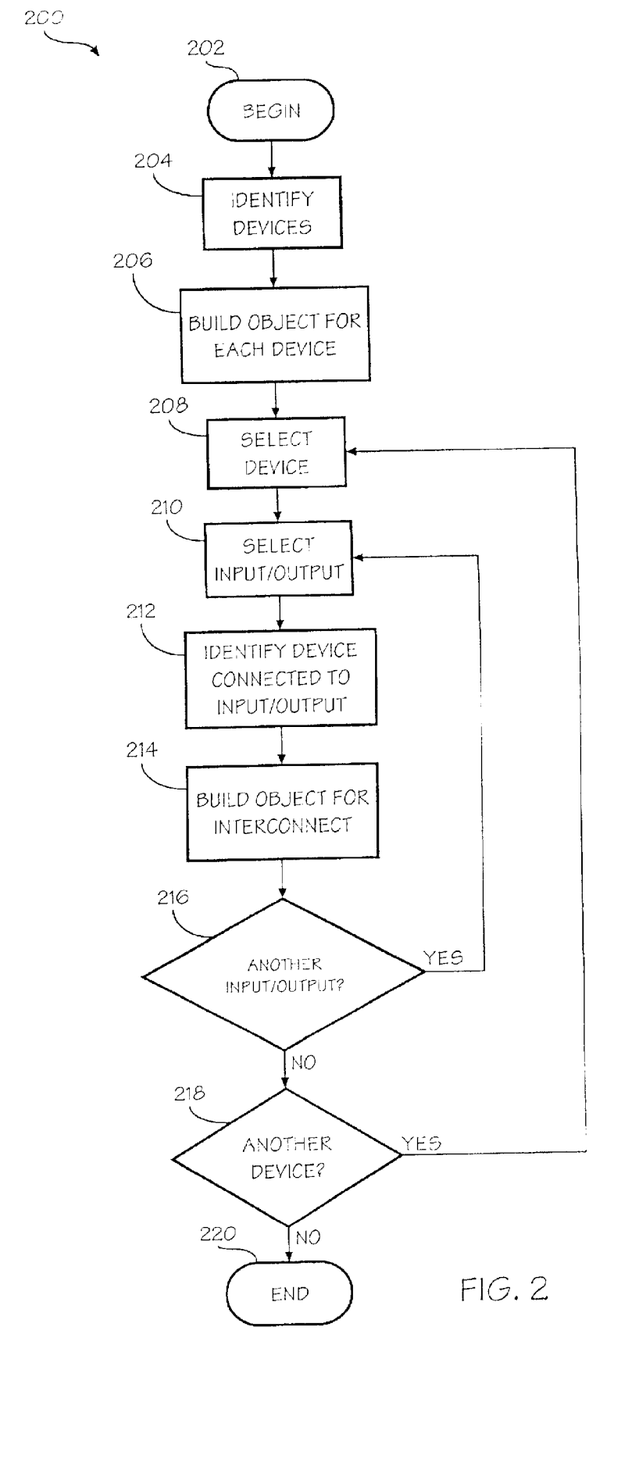
FIG. 2 is a flow diagram illustrating a method for identifying the interconnection of peripheral devices with the information handling system and generating a model representing the interconnection of devices.
Figure 3A:
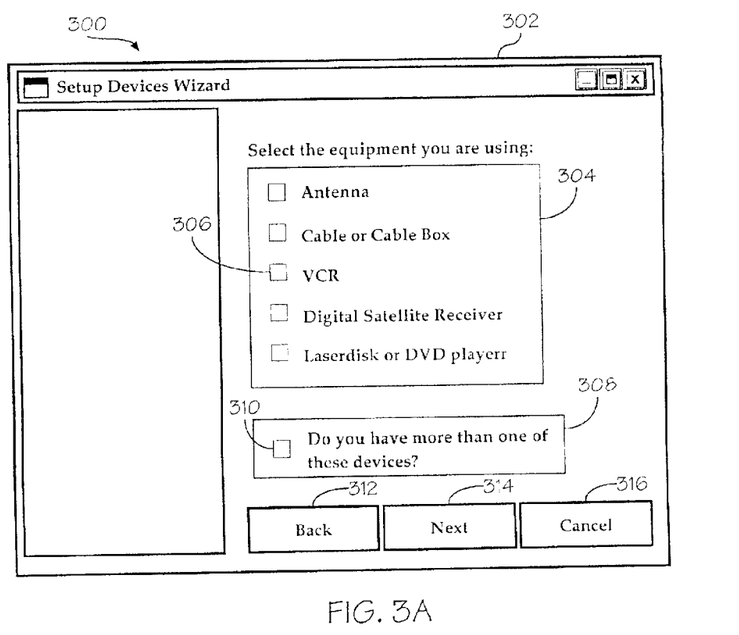
FIG. 3A is a schematic representation of a user interface configured to display an exemplary dialog box for querying the user for the identification of peripheral devices connected to the information handling system.

Referring now to FIG. 2, a flow diagram is shown illustrating a method for identifying the interconnection of peripheral devices and generating a model representing the interconnection of peripheral devices in the information handling system. Upon initiation of the method 200, at step 202, one or more devices within the information handling system are identified at step 204 (e.g., via query or hardware detection). For example, as shown in FIG. 3A, a user may be queried to enter the type and number of devices interconnected with the information handling system via a user interface 300 displayed on the display 114 of the hardware system 100 shown in FIG. 1. Preferably, the user interface 300 comprises a conventional graphical user interface utilizing a windowing environment. Such user interfaces may provide one or more dialog boxes 302 for soliciting responses from the user. These dialog boxes may be displayed sequentially to provide the user with a structured series of questions and options that leads the user through the process of identifying peripheral devices interconnected with the information handling system.

In an exemplary embodiment, a dialog box 302 may include a list 304 of devices that may be connected to the information handling system. A checkbox 306 may be displayed adjacent to the name of each device and used to select a device from the list 304. When a device is selected from the list 304, an "x" or a check mark appears in the checkbox 306. A peripheral input device such as a mouse, track ball, trackstick, keyboard, etc. (see FIG. 1) may be used to position an icon such as a pointer or cursor over the checkbox 306. The user may then click on the checkbox 306 (i.e., depress a button on the peripheral input device) causing the "x" or checkmark to appear therein. Alternately, the list 304 may be displayed as a conventional pull-down or pop-up menu. A scroll bar may be used with the peripheral input device to scroll up and down the list so that a device or devices from the list may be selected.

The dialog box 302 may also include a field 308 which asks a user to specify if the information handling system includes more than one of an identified device. Like the device list field 304, this field 306 may include a checkbox 310 positioned adjacent to text asking the user if the information handling system includes more than one of any of the selected devices. Such text may read, for example, "Do you have more than one of these devices?" If a user selects the checkbox 310, the user interface 300 may then allow the user to designate which device types are duplicated within the system. This may be accomplished, for example, by displaying a second dialog box (not shown) which requests that the user enter the number devices in the system.

Buttons 312, 314 & 316 may be displayed within each dialog box 302 to allow the user to shift between dialog boxes 302 of the user interface 300. For example, a button labeled "Back" 312 may be provided to allow a user to shift backwards in a series of dialog boxes 302. Similarly, a button labeled "Next" 314 may be provided to allow the user to shift forward while a button labeled "Cancel" 316 may be provided to allow the user to exit the user interface 300.

Referring again to FIG. 2, an object is built for each identified device in the model at step 206. Preferably, each of these device objects provide a generic representation of that particular type of device (e.g., a video cassette recorder (VCR), a cable adapter, Digital Satellite Receiver, DVD player, etc.). Depending on the generic representation of the device in the model, one or more inputs and/or outputs may be associated with the device. For example, a VCR typically includes one to three inputs (e.g., an antenna input, a rear line input, and a front AV (audio/video) line (AV-1) input) and at least one output (for connection to a television or monitor). Preferably, the device object providing a generic representation of such a VCR would include an object representing each of these inputs and outputs.

Figure 3B:
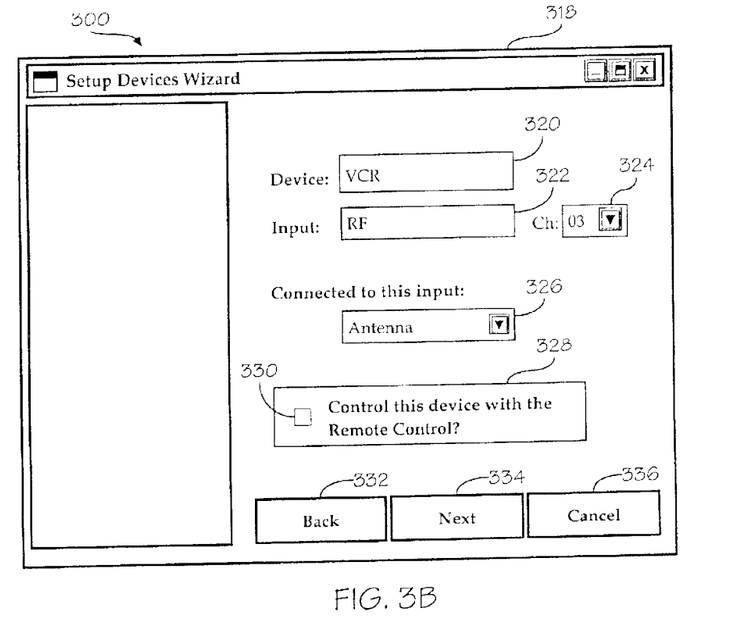
FIG. 3B is a schematic representation of the user interface shown in FIG. 3A configured to display a second exemplary dialog box for querying the user for the identification of peripheral devices connected to the inputs of each peripheral device connected to the information handling system.

Each identified device is then selected at step 208, starting with the first identified device. This may be accomplished by selecting the device object representing that device in the model. An input or output of the device is selected at step 210 by selecting an input object or output object in the device object representing the selected device. This input object or output object represents an input or an output of the selected device. A device connected to the selected input or output is then identified at step 212. For example, as shown in FIG. 3B, a user may be queried, via the user interface 300, to enter the type and number of devices connected to the selected input or output. Preferably, querying of the user may be initiated either by the user or by the information handling system.

A dialog box 318 provided by the user interface 300 may prompt the user to identify devices connected to the selected inputs and/or outputs of the device. Preferably, the dialog box 318 includes a device field 320 which displays the name of the selected device and an input field 322 (or an output field, not shown) which displays the name of the selected input (or output). If the selected input (or output) includes an additional selection attribute (e.g., for a VCR, as shown in FIG. 3B, whether the RF-input is tuned to channel 3 or 4), a control field 324 for selecting this additional attribute may also be provided.

Preferably, the dialog box 318 also provides an interconnect field 326 which allows the user to identify devices which are connected to the selected input or output (e.g., the input displayed in the input field 322) for the selected device (e.g., the device displayed in the device field 320). The interconnect field 326 may comprise, for example, a list which may be displayed as a conventional pull-down or pop-up menu. A scroll bar may be used with the peripheral input device to scroll up and down the list so that a device or devices from the list may be selected. The dialog box 318 may also include a remote control field 328 which allows the user to indicate if the device (e.g., the device displayed in the interconnect field 326) can be operated by a remote control device of the information handling system (see FIG. 1). This field 328 may include a checkbox 330 positioned adjacent to text asking the user if the selected device can be controlled by a remote control device. Buttons 332, 334 & 336 may be displayed within the dialog box 318 to allow the user to shift between dialog boxes 318 of the user interface 300.

It should be appreciated that modification or reconfiguration of the user interface 300 shown in FIGS. 3A and 3B, by one having ordinary skill in the art would not depart from the scope or the spirit of the present invention. For example, the configuration, order and layout of dialog boxes 302 & 318 displayed by the user interface 300 may be modified depending on the types of devices which may be interconnected with the information handling system. Further, a non-graphical user interface may be used instead of the graphical user interface shown in FIGS. 3A and 3B. Similarly, alternative (non-visual) user interfaces may be employed. Such devices include, but are not limited to, audio or tactile interfaces (e.g., for visually and/or hearing impaired users).

Returning now to FIG. 2, an interconnect object is built, at step 214, to represent the interconnection of the device identified at step 210 to the input or output selected at step 210. This interconnect object is associated with the selected input object or output object of the device object. Upon building the interconnect object, a determination is made at step 216 whether the device selected at step 208 includes another input or output for which an additional interconnect object must be built. If so, the next input or output for the device is selected at step 210 and steps 212–214 are repeated. Once interconnect objects are built for all devices connected to inputs and outputs of the selected device, a determination is made at step 218 whether another device has been identified for which interconnect objects must be built. If so, the next device is selected at step 208 whereupon steps 210–216 are repeated for that device.

For example, as shown in FIG. 3B, once a user has configured an input or an output for a selected device, the "Next" button 334 may be chosen (i.e., "clicked" on using the peripheral input device) causing another dialog box 318 to be displayed for configuring an additional input or output of the device or an input or output of another device. This process may be repeated until all inputs and outputs of all identified devices are configured. If the user wishes to return to a previously viewed dialog box 318, the "Back" button may be selected (i.e., "clicked" on using the peripheral input device) until the desired dialog box is displayed. After all devices have been iterated, the method ends at step 220.

Figure 4:
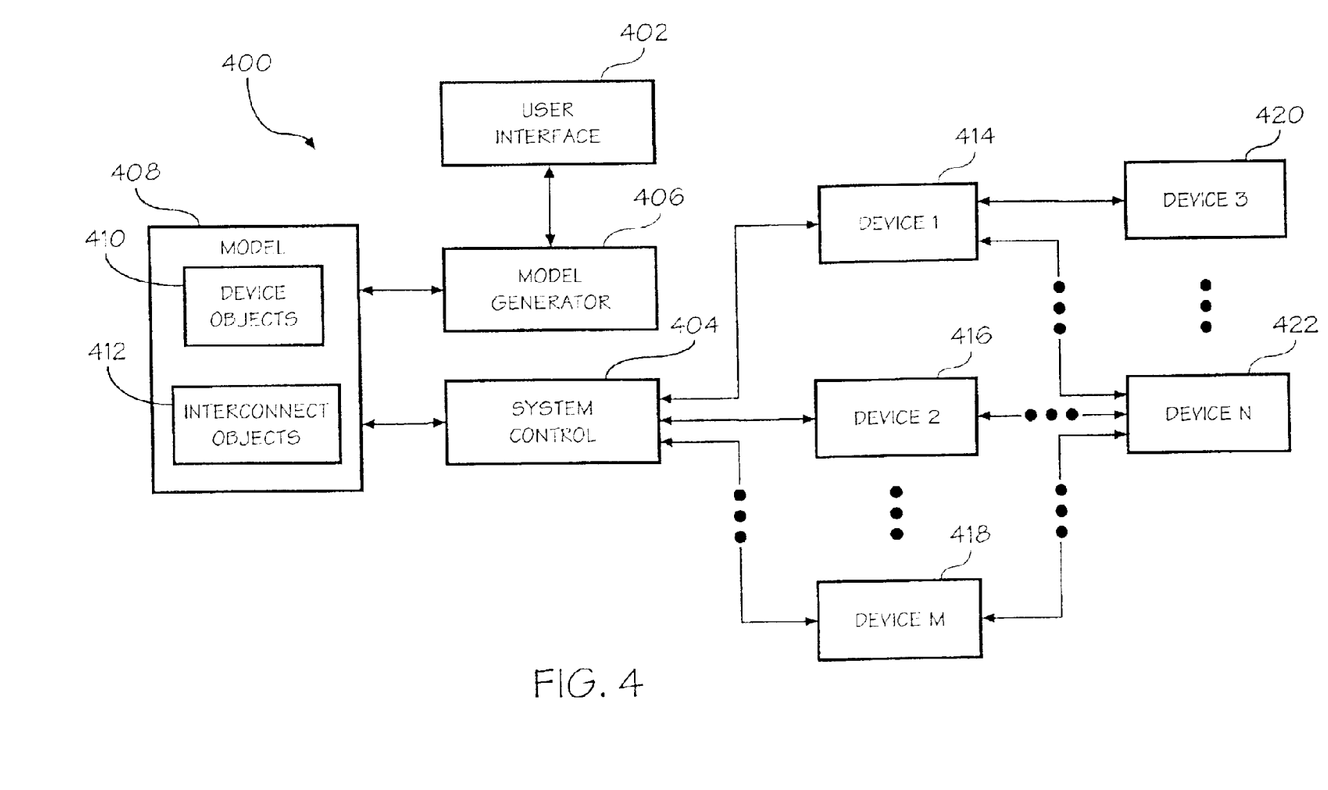
FIG. 4 is a block diagram illustrating a system in accordance with an exemplary embodiment of the invention for performing the method shown in FIG. 2.

Referring now to FIG. 4, a block diagram depicting a system for implementing the method of the present invention is shown. The system includes a user interface 402 for providing a sequence of dialogs with a user of the information handling system. The dialogs provided by the user interface 402 query the user to identify the number and types of devices in the information handling system. The dialogs may also identify how the devices are interconnected with the information handling system and each other. Preferably, the user interface comprises a conventional graphical user interface utilized in a windowing environment as shown in FIGS. 3A and 3B.

A model generator 406 may be interconnected with the user interface 402. The model generator 406 uses information entered by the user via the user interface 402 (or provided by the device) to generate a model of the devices 414–422 in the information handling system. Preferably, the model generator builds an object 410 & 412 in the model 408 for each device and each interconnection between two devices. The model may be stored, for example, in the memory 104 or persistent auxiliary memory 106 of the hardware system shown in FIG. 1.

A system controller 404 or the like of the information handling system may use the model 408 to control peripheral devices 414–422 interconnected with the information handling system (see FIG. 1) and represented within the model. For example, as shown in FIG. 4, a typical information handling system may include one or more devices (e.g., "DEVICE 1" 414, "DEVICE 2" 416, through "DEVICE M" 418) which may be coupled directly to the information handling system and controlled via the system controller 404. Any of these devices 414–418 may include one or more inputs and/or outputs to which other peripheral devices (e.g., "DEVICE 3" 420 through "DEVICE N" 422) may be interconnected. The model 408 may include one or more device objects 410 representing each of the devices 414–422 and one or more interconnect objects 412 representing the interconnection of each of the devices 414–422 with the information handling system (i.e., directly connected to an input or output of the information handling system, or interconnected with the information handling system via one or more peripheral devices).

Figure 5:
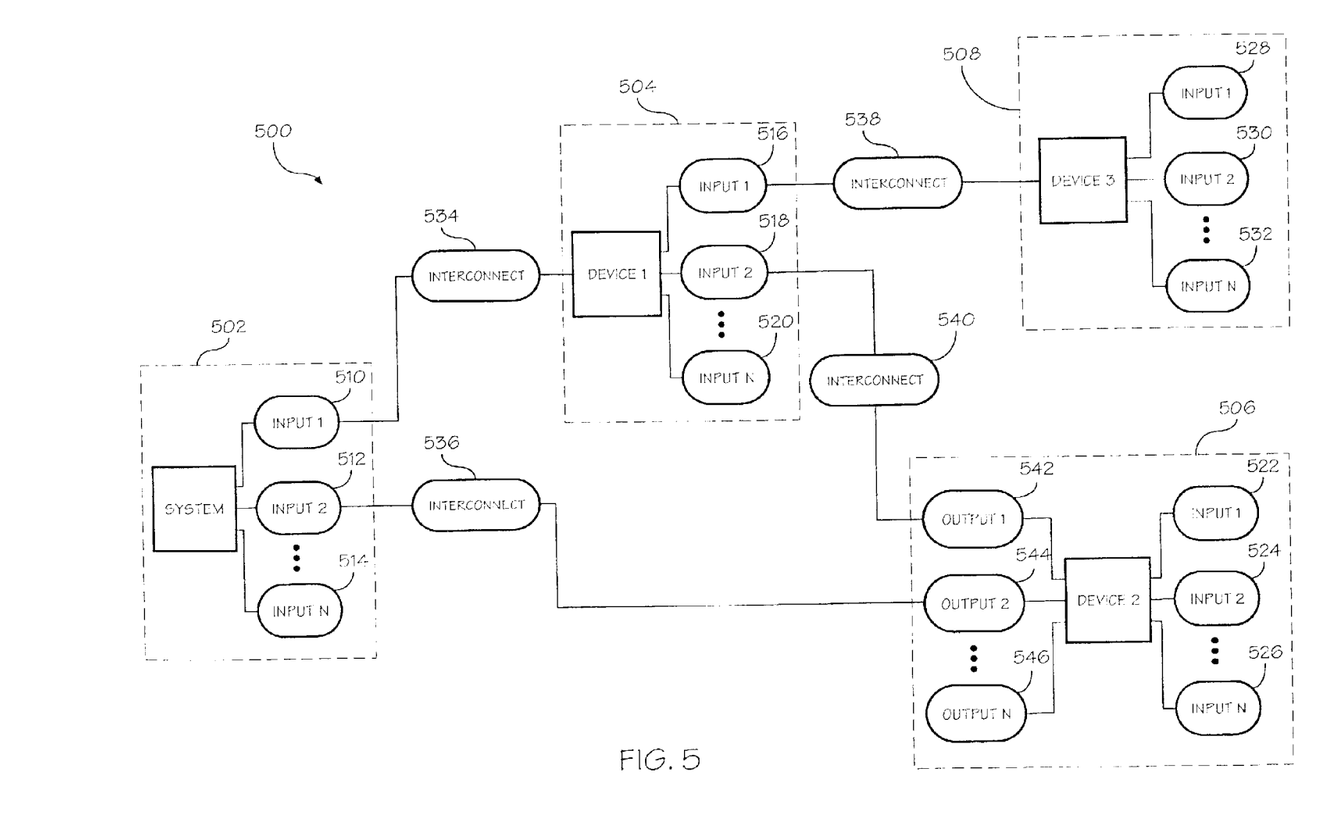
FIG. 5 is a block diagram depicting an exemplary model generated by the system and method of the present invention.

Referring now to FIG. 5, a block diagram representing a typical model which may be generated by the system and method of the present invention is shown. The model 500 represents the interconnection of peripheral devices with the information handling system and may be used by the system to control the devices. According to an exemplary embodiment, the model 500 identifies the number and types of devices in the information handling system and identifies how the devices are interconnected with the information handling system and each other. Preferably, the model 500 includes one or more objects which are created by the system and method of the present invention for each device, each input and output of each device, and each interconnection between a device and the information handling system or another device. These objects may be stored (e.g., in the memory or auxiliary memory of the hardware system shown in FIG. 1) for use in analysis and control of devices coupled to the system. Preferably, each object comprises a collection of routines and data structures that performs a particular task or implements a particular abstract data type. The object may, for example, consist of two parts: an interface, which lists the constants, data types, variables, and routines that can be accessed by other objects or routines, and an implementation, which is private (accessible only to the object) and which contains the source code that actually implements the routines in the object.

As shown in FIG. 5, the model 500 may include one or more device objects ("SYSTEM" 502, "DEVICE 1" 504, "DEVICE 2" 506, and "DEVICE 3" 508). These device objects 502–508 are generated by the system and method of the present invention to represent each device in the information handling system. The model 500 shown in FIG. 5 includes four device objects 502–508. However, it should be apparent to one skilled in the art that any number of device objects may be generated depending on the number of devices in the information handling system. Each device object 504–508 may include one or more input objects (e.g., "INPUT 1", "INPUT 2", . . . "INPUT N" 510–532) and/or output objects (e.g., "OUTPUT 1","OUTPUT 2", . . . "OUTPUT N" 542–546). The input objects 510–532 and output objects 542–546 represent the inputs and outputs of the device represented by the device object 502–508 with which it is associated. Interconnect objects ("INTERCONNECT") 534–540 represent the interconnection of each peripheral device with an input (or output, not shown) of the information handling system or an input or output of another peripheral device.

In an exemplary embodiment, the information handling system may comprise a convergence system (as described in connection with FIG. 1) used in a home theater environment. Such an information handling system preferably includes one or more inputs for connecting peripheral audio/video devices such as, for example, a VCR, DVD player, audio system, laserdisc player, etc. These inputs may include RF (Radio Frequency) inputs for connecting antennas, cable adapters, etc. and AV (audio/video) inputs for coupling audio/video devices.

A first peripheral device, for example a VCR, may be coupled to the information handling system via an input. This device may include inputs that correspond to RF inputs for connecting an antenna, cable TV adapter, or the like and AV inputs for coupling other audio/video devices (e.g., a video camera recorder (camcorder), a second VCR, a cable box, a satellite receiver, etc.) thereto. A second peripheral device, for example, a DVD player, may have only AV inputs for coupling other audio/video devices (e.g., a video camera recorder (camcorder), a second VCR, a cable box, a satellite receiver, etc.). A third peripheral device, such as a camcorder, may be interconnected to the first device (i.e., the VCR) via an AV Input. This device may itself have one or more inputs for coupling other peripheral input devices such as an antenna, cable adapter, or the like.

A model 500 for such an information handling system includes a device object ("SYSTEM") 502 representing the information handling system (e.g., a convergence system). This device object 502 includes multiple input objects (e.g., "INPUT 1" 510, "INPUT 2" 512, ... "INPUT N" 514) each representing a corresponding input of the information handling system.

A first device object ("DEVICE 1") 504, representing, for example, the VCR, may be coupled to the "SYSTEM" device object 502 via an input device object ("INPUT 1") 510. An interconnect object ("INTERCONNECT") 534 interconnects the "DEVICE 1" device object 504 with the "SYSTEM" device object 502. This interconnect object 534 represents the interconnection of the first device (i.e., VCR) and the information handling system. The first device object 502 may also include multiple input objects (e.g., "INPUT 1" 516, "INPUT 2" 518, ... "INPUT N" 520) each representing a corresponding input of first device.

Similarly, a second device object ("DEVICE 2") 506, representing, for example, the DVD player, may be coupled to the "SYSTEM" device object 502 via an input device object ("INPUT 2") 512. Like the first device object 504, the second device object 506 includes multiple input objects (e.g., "INPUT 1" 522, "INPUT 2" 524, ... "INPUT N" 526) each representing a corresponding input of the second device (i.e., the DVD player). The second device object ("DEVICE 2") 506 further includes multiple output objects (e.g., "OUTPUT 1" 542, "OUTPUT 2" 544, ... "OUTPUT N" 546) each modeling a corresponding output of the second device ("DEVICE 2") 506. Interconnect objects ("INTERCONNECT") 536 & 540 connect output objects ("OUTPUT 1" 542 and "OUTPUT 2" 544) of the second device object ("DEVICE 2") 506 with the first device object ("DEVICE 1") 504 (via the second input object ("INPUT 2") 518) and the system device object ("SYSTEM") 502 (via the second input object ("INPUT 2") 512). The interconnect objects 536 & 540 represent the interconnection of the second device (i.e., DVD player) both directly with the information handling system (via an input of the system) and indirectly via the second device (i.e., the VCR, via an input of the VCR). In this manner, information stored on an optical disc (DVD) may, for example, be played and viewed via a display device (e.g., monitor, television, etc., not shown) interconnected with the system, or, alternatively, may be recorded to video cassette tape via the VCR.

A third device object ("DEVICE 3") 508, representing, for example, the camcorder, may be coupled to the first device object 504 via an input device object ("INPUT 1") 516. An interconnect object ("INTERCONNECT") 538 interconnects the third device object 508 with the first device object 504. This interconnect object 538 represents the interconnection of the third device (i.e., the camcorder) and first device object (i.e., a VCR). The third device object 508 may also include multiple input objects(e.g., "INPUT 1" 528, "INPUT 2" 530, ... "INPUT N" 532) each representing a corresponding input of third device (i.e., the camcorder).

It will be appreciated by one skilled in the art that an information handling system and peripheral devices may each have multiple (i.e., up to N) inputs and/or multiple (i.e., up to N) outputs allowing multiple (i.e., up to $N^N$) peripheral devices to be interconnected with the information handling system. Thus, a model of such an information handling system may include multiple (i.e., up to $N^N$) device objects for representing each peripheral device of the information handling system. Similarly, such a model would include a corresponding number of input objects, output objects and interconnect objects for representing each input and output of each peripheral device and each interconnection between a peripheral device and the information handling system or other peripheral devices.

Although the invention has been described with a certain degree of particularity, it should be recognized that elements thereof may be altered by persons skilled in the art without departing from the spirit and scope of the invention. Embodiments of the present invention may be implemented as sets of instructions resident in the main memory 104 of one or more computer systems configured generally as described in FIG. 1. Until required by the computer system, the set of instructions may be stored in another computer readable medium or memory, for example in a hard disk drive, or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions may be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, chemically, physically, optically, or holographically so that the medium carries computer readable information. The present invention may also be implemented via hardware which would not require storage of a set of instructions in memory.

It is believed that the system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for generating a model representing devices and interconnections of the devices within an information handling system and using the model to control the devices, the method comprising:

querying a user for identifying first and second devices connected to the information handling system;

storing a first device object representing the first identified device and a second device object representing the second identified device;

identifying an interconnection between the first identified device and the second identified device and querying the user to specify if at least one of the first and second devices may be controlled by a remote control; and storing an interconnect object representing the interconnection between the first identified device with the second identified device, wherein the stored first and second device objects and interconnect object form at least part of the model.

2. The method according to claim 1, further comprising the step of using the model to control operation of at least one of the first device and the second device.

3. The method according to claim 2, further comprising the steps of: identifying an input of at least one of the first device and the second device; and storing an input object in the model representing the identified input.

4. The method according to claim 3, further comprising the steps of: identifying an output of at least one of the first device and the second device; and storing an output object in the model representing the identified output.

5. The method according to claim 1, wherein the querying step comprises providing a user interface for communicating queries to the user.

6. The method according to claim 1, wherein the querying step is initiated by the user.

7. The method according to claim 1, wherein the querying step is initiated by the information handling system.

8. The method according to claim 1, wherein the identifying step further comprises querying the user to set an attribute of at least one of the first and second devices.

9. The method according to claim 1, further comprising the step of saving the model in persistent memory.

10. A computer readable medium whose contents cause a computer-based information handling system to execute method steps for generating a model representing devices and interconnections of the devices within the information handling system and using the model to control the devices, the method steps comprising:
   querying a user for identifying first and second devices connected to the information handling system;
   storing a first device object representing the first identified device and a second device object representing the second identified device;
   identifying an interconnection between the first identified device and the second identified device and querying the user to specify if at least one of the first and second devices may be controlled by a remote control; and
   storing an interconnect object representing the interconnection between the first identified device with the second identified device, wherein the stored first and second device objects and interconnect object form at least part of the model.

11. The computer readable medium according to claim 10, whose contents further cause the computer-based information handling system to perform the step of using the model to control operation of at least one of the first device and the second device.

12. The computer readable medium according to claim 11, whose contents further cause the computer-based information handling system to perform the method steps of:
   identifying an input of at least one of the first device and the second device; and
   storing an input object in the model representing the identified input.

13. The computer readable medium according to claim 11, whose contents further cause the computer-based information handling system to perform the method steps of:
   identifying an output of at least one of the first device and the second device; and
   storing an output object in the model representing the identified output.

14. The computer readable medium according to claim 10, wherein the querying step comprises displaying a user interface on a display of the information handling system for providing the queries to the user.

15. The computer readable medium according to claim 10, wherein the identifying step further comprises querying the user to set an attribute of at least one of the first and second devices.

16. The computer readable medium according to claim 10, wherein the querying step is initiated by the user.

17. The computer readable medium according to claim 10, wherein the querying step is initiated by the information handling system.

18. The computer readable medium according to claim 10, whose contents further cause the computer-based information handling system to perform the method step of saving the model in persistent memory.

19. A system for generating a model representing devices and interconnections of the devices within an information handling system and using the model to control the devices, comprising:
   means for identifying first and second devices connected to the information handling system by querying a user to identify devices interconnected with the information handling system;
   means for storing a first device object representing the first identified device and a second device object representing the second identified device;
   means for identifying an interconnection between the first identified device and the second identified device, the identifying means comprising means for querying the user to specify if at least one of the first second devices can be controlled by a remote control; and
   means for storing an interconnect object representing the interconnection between the first identified device with the second identified device, wherein the stored first and second device objects and interconnect object form at least part of the model.

20. The system according to claim 19, further comprising means for using the model to control operation of at least one of the first device and the second device.

21. The system according to claim 20, further comprising: means for identifying an input of at least one of the first device and the second device; and means for storing an input object in the model representing the identified input.

22. The system according to claim 20, further comprising: means for identifying an output of at least one of the first device and the second device; and means for storing an output object in the model representing the identified output.

23. The system according to claim 19, wherein the identifying means further comprises means for querying the user to set an attribute of at least one of first and second devices.

24. The system according to claim 19, further comprising means saving the model in persistent memory.

25. A system for generating a model representing devices interconnected with an information handling system and interconnections of the devices to at least one of the information handling system and other devices interconnected with the information handling system, and using the model to control the devices; comprising:
   a user interface for providing communication with a user to identify a device interconnected with the information handling system, the user interface querying the user for setting an attribute of an identified device and to specify if the identified device may be controlled by a remote control; and
   a model generator for generating a model representing the identified device and the interconnection of the identified device with one of the information handling system,
   wherein the model includes a device object representing the identified device and an interconnect object representing the interconnection between the identified device and the information handling system.

26. The system according to claim 25, wherein the user interface provides communication with a user to identify a second device interconnected with at least one of the information handling system and the first identified device, and wherein the model generated by the model generator includes a second device object representing the second identified device and at least a second interconnect object representing the interconnection between one of the second identified device and the information handling system and the second identified device and the first identified device.

27. The system according to claim 26, wherein the first and second device objects and the first and second interconnect objects each comprise an interface and an implementation, the interface including a routine and the implementation including source code implementing the routine for controlling the identified device or interconnection which the device object or interconnect object represents.

28. The system according to claim 27, wherein the interface further comprises at least one of a constant, a data type and a variable.

\* \* \* \* \*